United States Patent
Bury

(10) Patent No.: US 7,920,905 B2
(45) Date of Patent: Apr. 5, 2011

(54) MOBILE PHONE HOLDER, ESPECIALLY FOR MECHANICAL VEHICLE

(75) Inventor: Henryk Bury, Mielec (PL)

(73) Assignee: BURY Sp. z o.o., Mielec (PL)

( * ) Notice: Subject to any disclaimer, the term of this patent is extended or adjusted under 35 U.S.C. 154(b) by 579 days.

(21) Appl. No.: 12/042,115

(22) Filed: Mar. 4, 2008

(65) Prior Publication Data

US 2008/0234013 A1 Sep. 25, 2008

(30) Foreign Application Priority Data

Mar. 23, 2007 (EP) .................................... 07460007

(51) Int. Cl.
*H04M 1/00* (2006.01)

(52) U.S. Cl. ............... 455/575.1; 455/575.3; 455/575.4; 455/575.6; 455/575.8; 455/575.9; 455/90.3; 379/455; 379/445; 379/446

(58) Field of Classification Search ............... 455/575.1, 455/575.4, 575.6, 575.8, 575.9, 90.3; 379/445, 379/446, 454, 455, 429, 449
See application file for complete search history.

(56) References Cited

U.S. PATENT DOCUMENTS

| | | | | |
|---|---|---|---|---|
| 5,825,874 A * | 10/1998 | Humphreys et al. | .......... | 379/446 |
| 5,832,082 A * | 11/1998 | Nagai | ............. | 379/446 |
| 6,185,302 B1 * | 2/2001 | Rytkonen et al. | ............. | 379/446 |
| 6,438,229 B1 * | 8/2002 | Overy et al. | ................... | 379/446 |
| 6,738,477 B1 | 5/2004 | Kam | | |
| 7,072,689 B1 * | 7/2006 | Aldern et al. | ................ | 455/90.3 |
| 2002/0090918 A1 * | 7/2002 | Grimm | ........................... | 455/90 |
| 2006/0058070 A1 | 3/2006 | Chang | | |
| 2006/0215836 A1 * | 9/2006 | Wang | ............................ | 379/455 |

* cited by examiner

*Primary Examiner* — Kamran Afshar
*Assistant Examiner* — Thai Vu
(74) *Attorney, Agent, or Firm* — Matthias Scholl P.C.; Matthias Scholl

(57) ABSTRACT

Taught is a mobile phone holder, especially for a mechanical vehicle, having a two-part body with side clamps and provided with a coupling/locking module, which has two step-shaped side clamps (10) on both of its sides. The side clamps are provided with a tooth (14) on their upper arm and are coupled with each other by means of unlocking buttons (3). The clamps are also provided with pins, which engage with the guides and the cams in the body and thus make the clamps move with a translational motion towards the inside of the holder combined with a concurrent rotational motion towards the inside of the holder. In the end phase of this motion the clamps are locked thus also locking the mobile phone in the holder.

5 Claims, 7 Drawing Sheets

MOBILE PHONE HOLDER, ESPECIALLY FOR MECHANICAL VEHICLE

CROSS-REFERENCE TO RELATED APPLICATIONS

This application claims priority to the European Patent Application No. EP07460007 filed Mar. 23, 2007, the contents of which are incorporated herein by reference.

BACKGROUND OF THE INVENTION

1. Field of the Invention

This invention relates to a mobile phone holder, especially for a mechanical vehicle, suitable for two-part mobile phones: a flip-type mobile phone and a slider-type mobile phone.

2. Description of the Related Art

In the $20^{th}$ century, the commonly used mobile phones were most often one-part devices (bar-type phones) with keypads and a display provided on their top surface.

However, in the $21^{st}$ century two-part mobile phones have been increasingly used. Both parts of such phones are either coupled by means of a hinge in case of flip-type mobile phones or the upper part is slideably mounted in the guiding elements of the lower part in case of slider-type mobile phones.

The lower part of a two-part mobile phone is provided with keypads on its top surface whereas the slideable or openable part is provided with a display.

The phones of this type have been so far provided with a holder as described by German patent No. DE 19 621 014 C1. This holder, mounted in a mechanical vehicle, has a body, in which two side clamps are mounted slideably and crosswise; the clamps, forced by a spring, press the mobile phone placed between them. The holder is also provided with a mechanism to lock the clamps in a set position, and with release buttons, which enable unlocking the clamps.

The U.S. Pat. No. 5,187,744 describes a mobile phone holder provided with two pairs of side clamps. One clamp in each pair of clamps is slideably mounted in the main body of the holder and pressed by a spring, while the other clamp in each pair of clamps is mounted tiltably and also pressed by a spring. Thanks to a flexible four-point clamping the mobile phone sits in the holder more firmly.

The U.S. Pat. No. 5,832,080 describes a holder suitable for mobile phones provided with holes (so-called pilots) on their side surface. This holder has a body on which couplers are mounted and slide along a cam. In their upper position the couplers are tilted. While a mobile phone is inserted into the holder, the couplers slide downwards along the cam, which guides them into the pilots and then locks them in this position. One inconvenience of this holder is that it is suitable only for mobile phones, which have the pilots on their side surfaces.

The International PCT Application Publication No. WO98/11747 describes a mobile phone holder, the main body of which has a cavity in its lower part and a spring coupler with a rotatably mounted clamping pin. A lower part of a mobile phone can be suitably inserted into the cavity. The clamping pin, forced by the mobile phone being inserted into the holder, catches the upper part of the mobile phone and presses towards the surface of the holder.

The major inconvenience of all holders referenced above is that they are not suitable for two-part mobile phones, thickness of the lower part of which placed is much smaller than the thickness of one-part mobile phones.

The object of this invention is thus to provide a mobile phone holder, especially for a mechanical vehicle, which is suitable for two-part mobile phones, both slider-type and flip-type ones, the thickness of the lower part (main body) of which is much smaller than that of one-part mobile phones used so far. It is desired that the holder be also suitable for new-generation one-part mobile phones, which have a significantly small thickness and which as a result cannot be provided with pilots. According to the present invention, the mobile phone holder shall be characterized by a universal applicability, i.e., shall be suitable for various types of mobile phones, even of varying length.

SUMMARY OF THE INVENTION

The object of this invention is achieved by a mobile phone holder, especially for a mechanical vehicle, according to this invention. The holder is provided with a coupling/locking module having side clamps on its both sides. On the upper arm of each of the clamps there is provided a tooth. Both of the side clamps are coupled with each other by means of unlocking buttons and are provided with pins. The pins engage with the guides in the body and thus make the clamps move with a translational motion towards the inside of the holder combined with a concurrent rotational motion towards the inside of the holder. In the end phase of this motion the clamps are locked thus locking also the mobile phone in the holder.

The side clamps are favourably provided on both sides with a pair of pins, which slide into the guiding grooves of the lower part of the body and make the side clamp move towards the inside of the holder, and with at least one pin, which engages with a cam on the upper part of the body and makes the side clamp move rotationally towards the inside of the holder.

The side clamps of the coupling/locking module are preferably provided with a pair of pins, which in the end phase of their motion pass through a hole in the unlocking button thus locking the side clamps in their closed position and making the mobile phone lock in the holder.

The coupling/locking module of the holder, according to this invention, is preferably provided with unlocking buttons, which are located slideably between the upper part and the lower part of the body and provided with a hole which the pins pass through. The buttons are connected with each other with a spring and a wheel mounted in the lower part of the body and coupling both of the buttons.

The side clamps are preferably provided with holes for mounting a spring; the spring lifts the side clamps and the mobile phone.

The upper part of the holder body, according to the invention, is favourably provided with a slot, in which a replaceable coupling insert is located. The insert is provided with an elastic locating means adjusted to the length of the mobile phone.

The performance tests of the mobile phone holder, according to the invention, showed that even mobile phones of a very small thickness could be held in the holder firmly and that the holder can be used with various types of mobile phones.

BRIEF DESCRIPTION OF THE DRAWINGS

The mobile phone holder according to this invention is depicted in the accompanying drawings of which.

Figure 1:
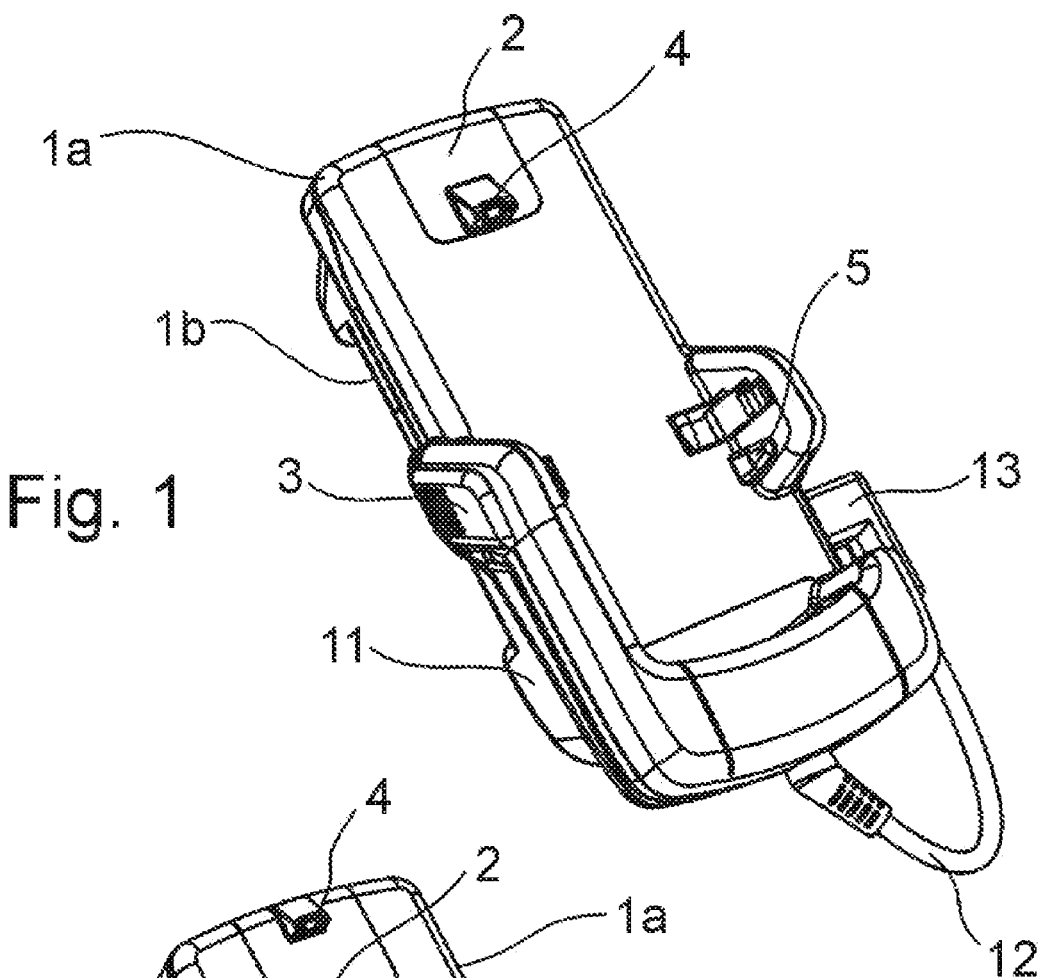
FIG. 1 is a perspective view of a mobile phone holder for phones having a smaller length according to an embodiment of the invention.

The following references are used in the drawings: 1a—an upper part of the body; 1b—a lower part of the body; 2—a replaceable coupling insert; 3—unlocking buttons; 4—an elastic locating means of the insert 2; 5—a protrusion in the upper part of the body for locating the mobile phone; 6—a slider-type mobile phone; 7—a flip-type mobile phone; 8—a lower base part of the slider-type mobile phone; 9—a lower base part of the flip-type mobile phone; 10—a side clamp; 11—a plate; 12—a cable; 13—a plug of the cable; 14—a tooth in the side clamp; 15—a guiding pin; 16—a locking pin; 17—a guiding groove; 18—a protrusion in the lower part of the body; 19—a hole in the side clamp for the first spring; 20—a first spring; 21—guiding grooves in the protrusion of the lower part of the body; 22—a protrusion in the lower part of the body; 23—a hole in the unlocking button; 24—a protruding pin of the side clamp; 25—a cam of the upper part of the body; 26—a spring pushing out the unlocking buttons; and 27—a wheel coupled with both unlocking buttons by means of articulated joints.

DETAILED DESCRIPTION OF THE INVENTION

Figure 2:
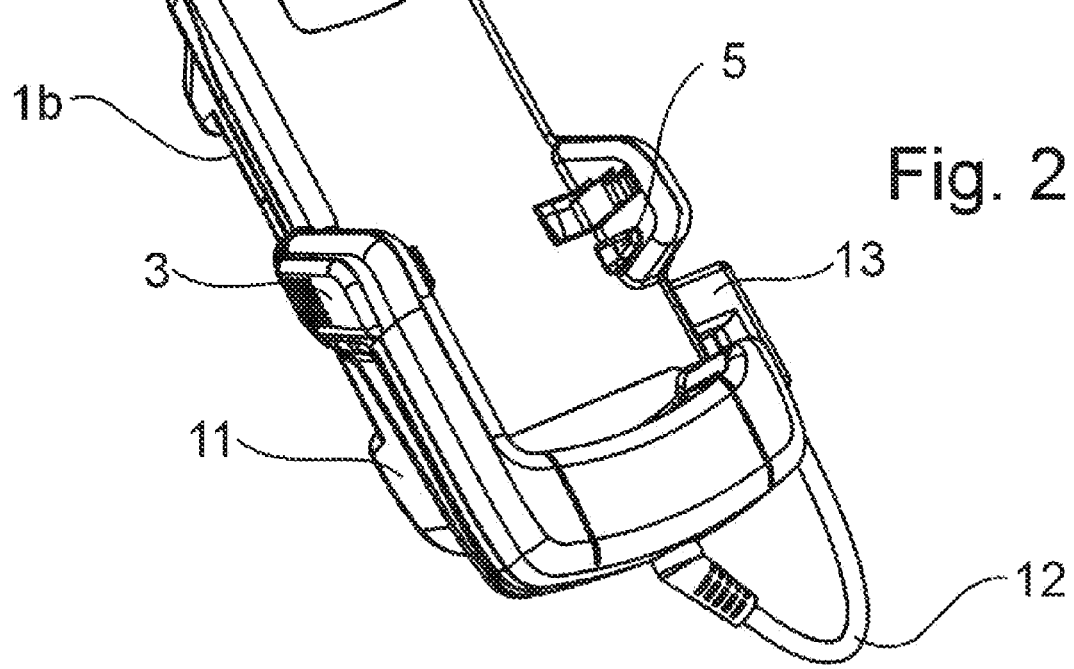
FIG. 2 is a perspective view of a mobile phone holder for phones having a bigger length according to an embodiment of the invention.

The holder depicted in FIGS. 1 and 2 comprises a two-part body 1a, 1b, usually mounted to a dashboard of a mechanical vehicle, a coupling/locking module located within the body and provided with the unlocking buttons 3 located at both sides of the body, which buttons release the lock, and a replaceable coupling insert 2 mounted in the upper part of the body 1a and provided with an elastic locating means 4.

As shown in FIG. 1, the holder having the coupling insert 2 is provided in its lower part with an elastic locating means 4 and is adjusted to a smaller length of a mobile phone. As shown in FIG. 2, the holder having the coupling insert 2 provided in its upper part with an elastic locating means 4 and is adjusted to a bigger length of a mobile phone. The upper part of the body 1a is also provided on both sides with the protrusions 5, which define the side-to-side location of the mobile phone in the holder.

Figure 3:
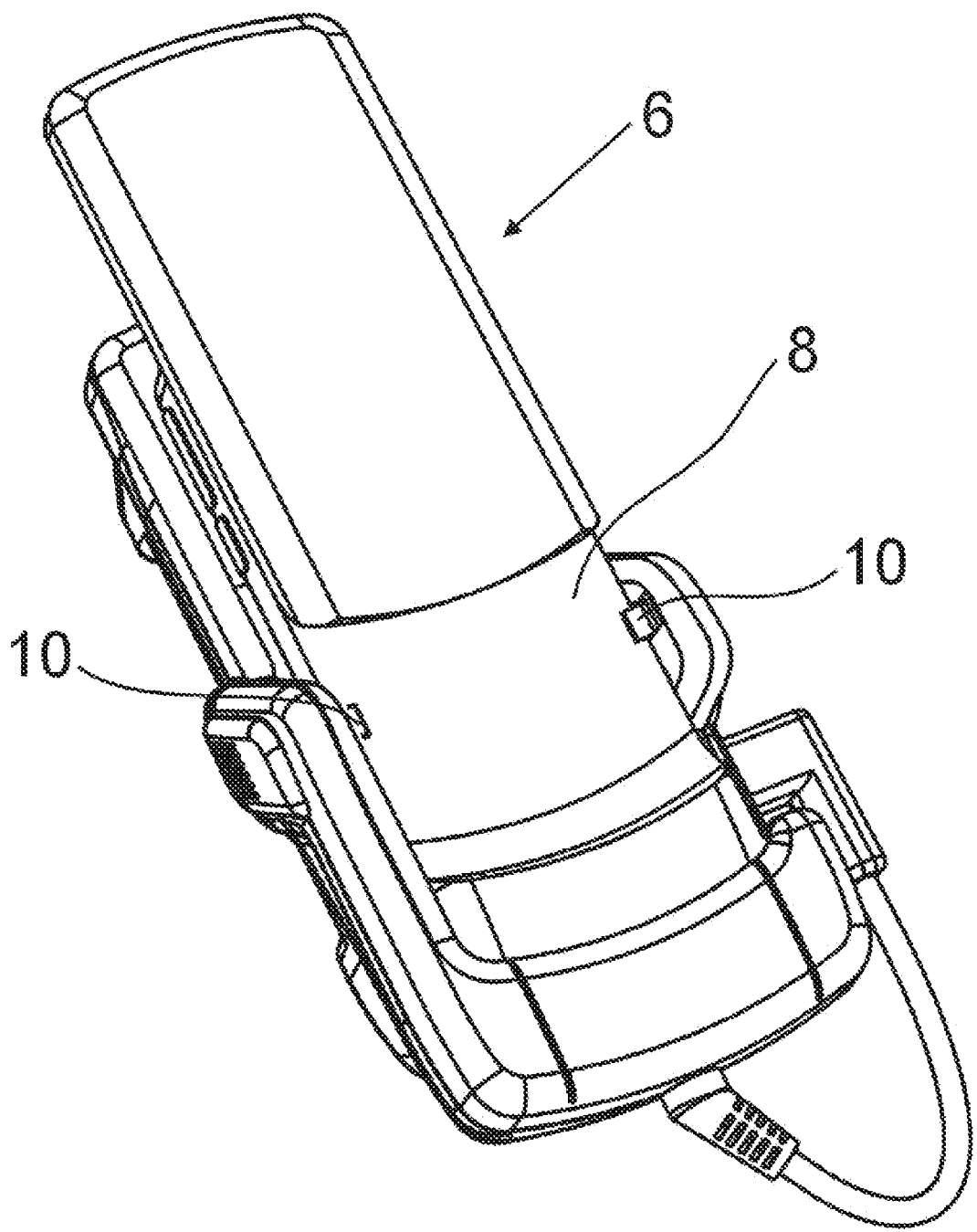
FIG. 3 is a perspective view of a holder with a slider-type mobile phone according to an embodiment of the invention.
Figure 4:
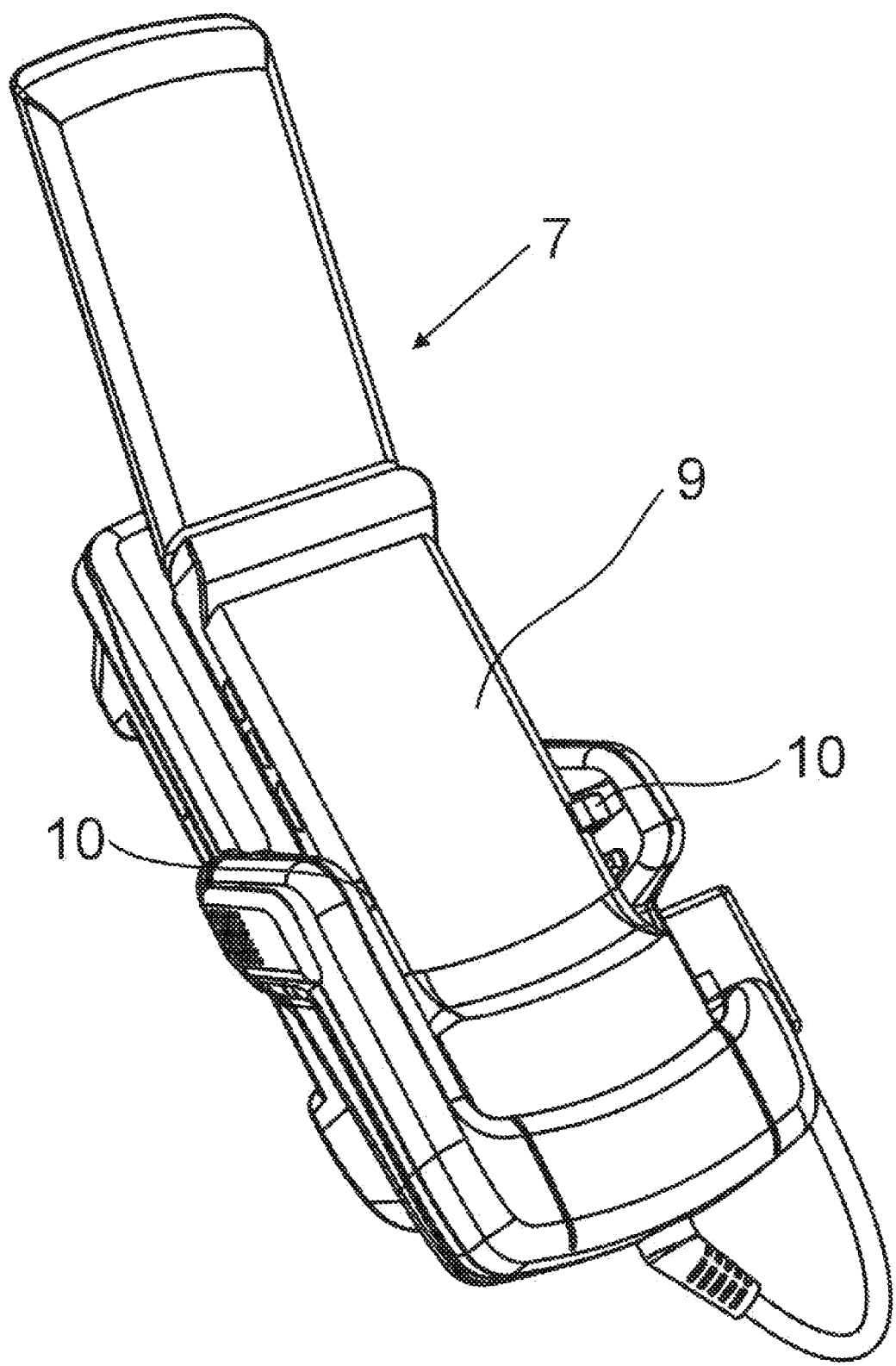
FIG. 4 is a perspective view of a holder with a flip-type mobile phone according to an embodiment of the invention.
Figure 5:
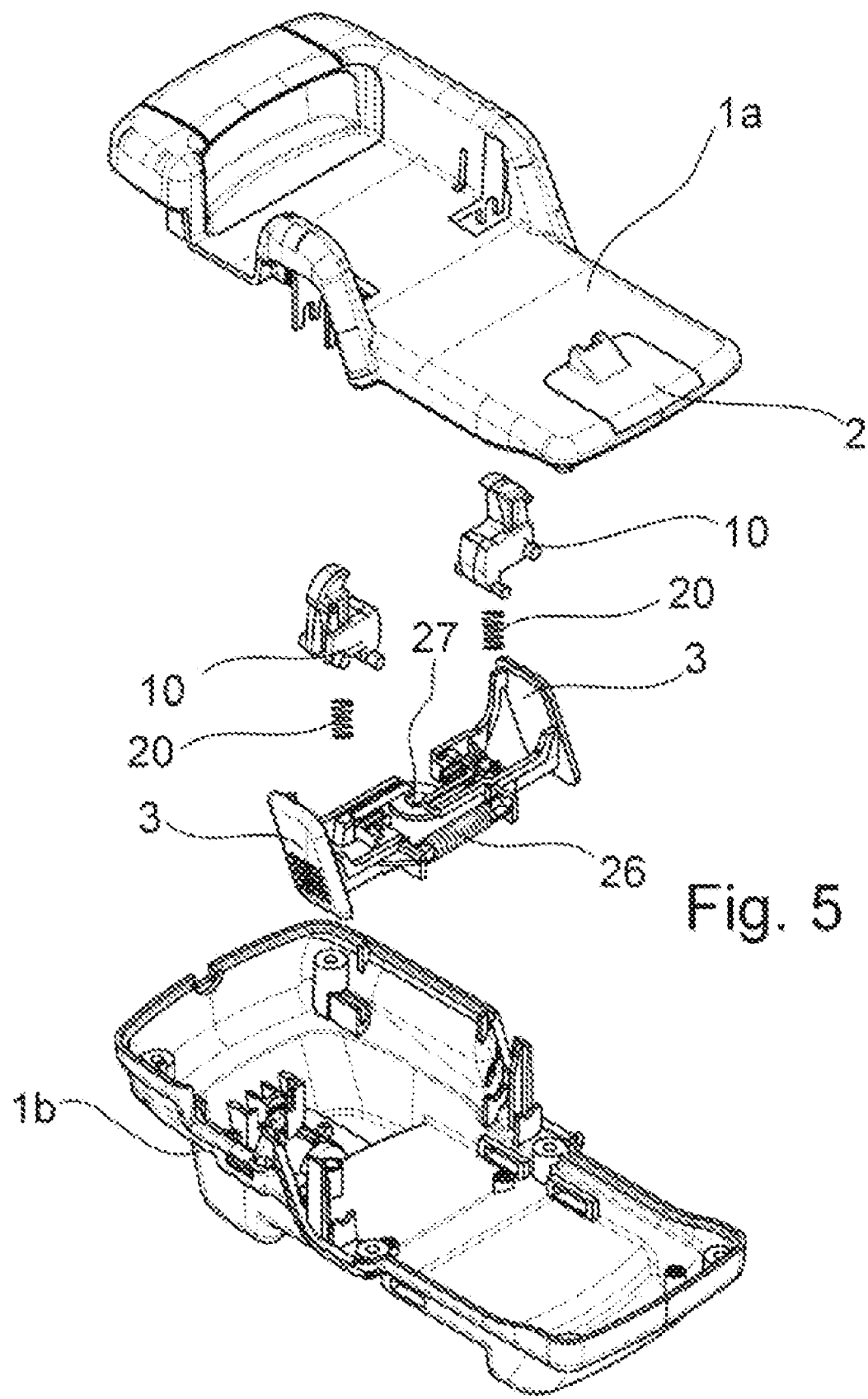
FIG. 5 is an exploded perspective view of a holder according to an embodiment of the invention.
Figure 6:
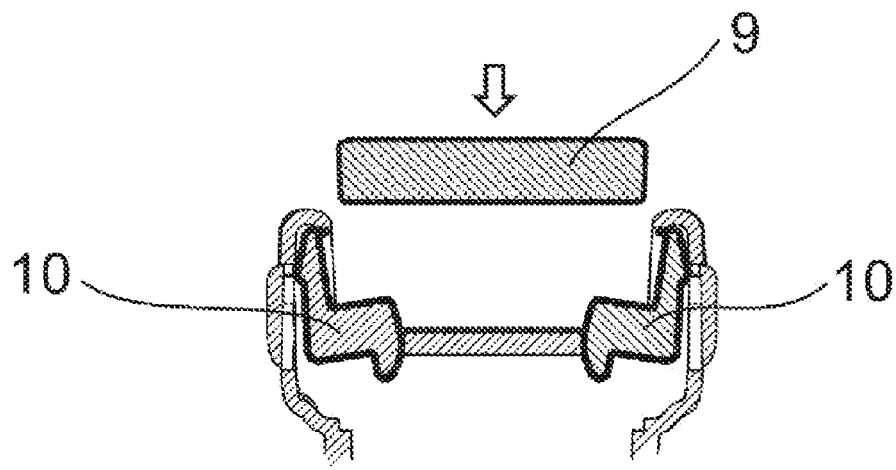
FIG. 6 is a cross-sectional view of the holder in a position ready for inserting the mobile phone according to an embodiment of the invention.

FIG. 3 illustrates the mobile phone holder with a slider-type mobile phone 6 locked in the holder, while FIG. 4 illustrates the same mobile phone holder with a flip-type mobile phone 7 locked therein. In both cases the lower base parts 8 and 9, respectively, are clamped and protected from slipping out by the side clamps 10 of the coupling/locking module.

The mobile phone holder, according to the invention, as shown in FIGS. 1 to 4 can be mounted to a dashboard of a mechanical vehicle by means of a hanger. For this purpose the lower part of the body 1b is connected with a plate 11, which is provided with a socket for a multi-pin connector, not shown on the drawing. Alternatively, the lower part of the body is mounted directly to the dashboard, for instance, by means of screws. Obviously, other mounting methods are also acceptable. The mobile phone holder, as depicted in FIGS. 1 to 4, is provided with a cable 12 having a plug 13 at its end. The cable connects the mobile phone to the electric power system of the vehicle.

The coupling/locking module depicted in FIGS. 5 to 10 is provided with two side clamps 10 on both sides of the holder. Each clamp 10 comprises a main arm provided with a tooth 14. In its lower part the clamp is provided with two pairs of pins 15 and 16, while the rear surface of the clamp has a guiding groove 17, which engages with a profiled protrusion 18 in the lower part of the body 1b. The clamp 10 is also provided with a hole 19 wherein the first spring 20 is mounted.

The pair of guiding pins 15, located on both sides of the holder, slides in the grooves 21 in the protrusions 22 of the lower part 1b of the holder body, while the other pair of guiding pins 16 goes through the hole 23 of the unlocking button 3 for releasing the lock. The clamp 10 is additionally provided with a pin 24 protruding on one side, which slides along the cam 25 in the upper part 1a of the body.

Both unlocking buttons 3, which release the lock and which are located on both sides of the body, are coupled with each other by means of the second spring 26 and the coupling wheel 27, which allows a concurrent motion of both unlocking buttons 3, which are connected to the wheel 27 by means of articulated joints.

Figure 7:
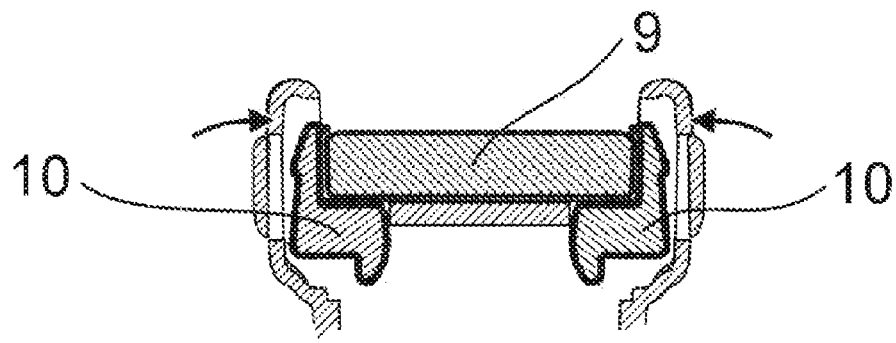
FIG. 7 is a cross-sectional view of the holder with a mobile phone inserted and locked in it according to an embodiment of the invention.
Figure 8:
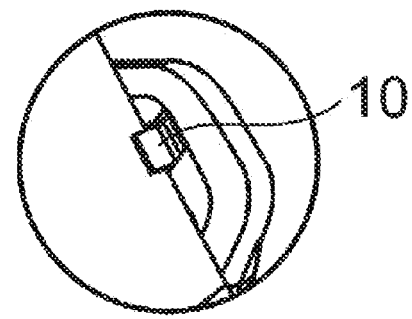
FIG. 8 is a detailed perspective view of the side clamp, which locks a mobile phone in the holder according to an embodiment of the invention.
Figure 9:
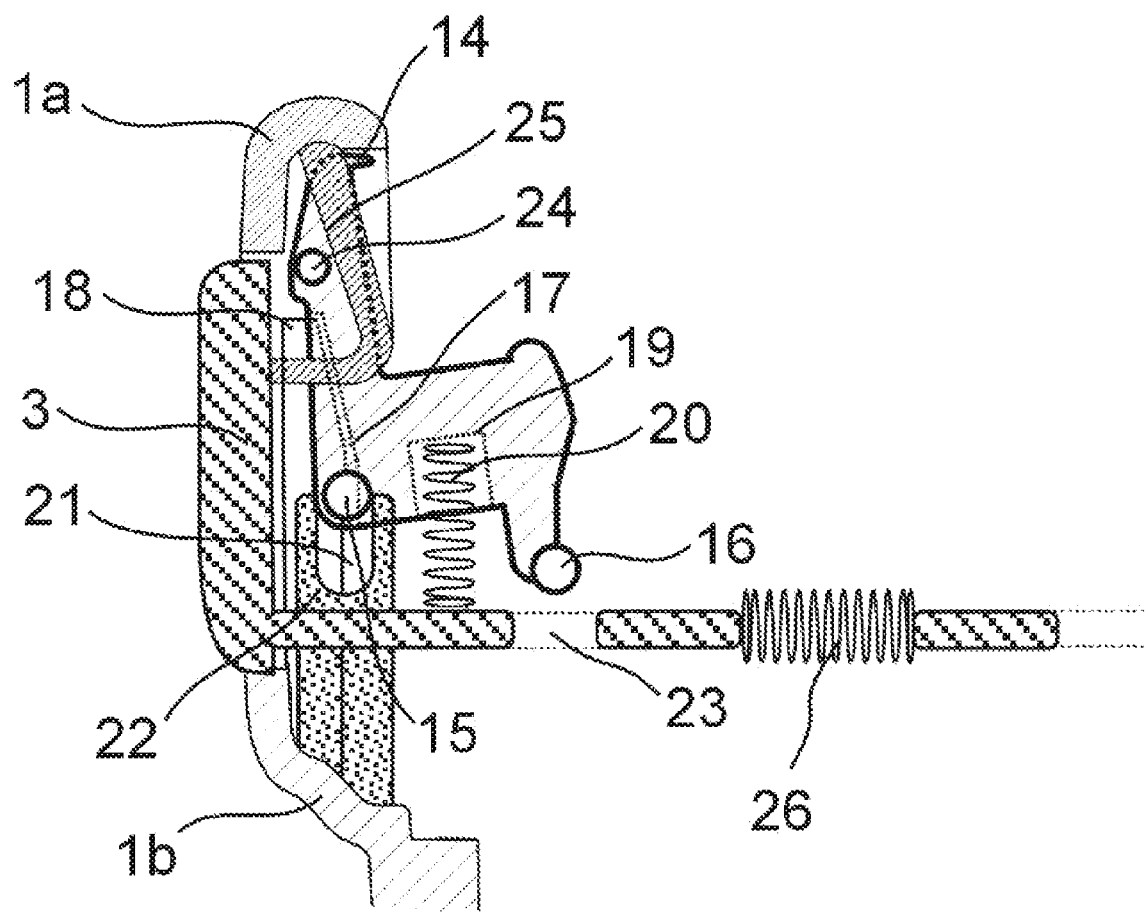
FIG. 9 is a cross-sectional view of the coupling/locking module with a side clamp in its initial position, ready for inserting a mobile phone according to an embodiment of the invention.
Figure 10:
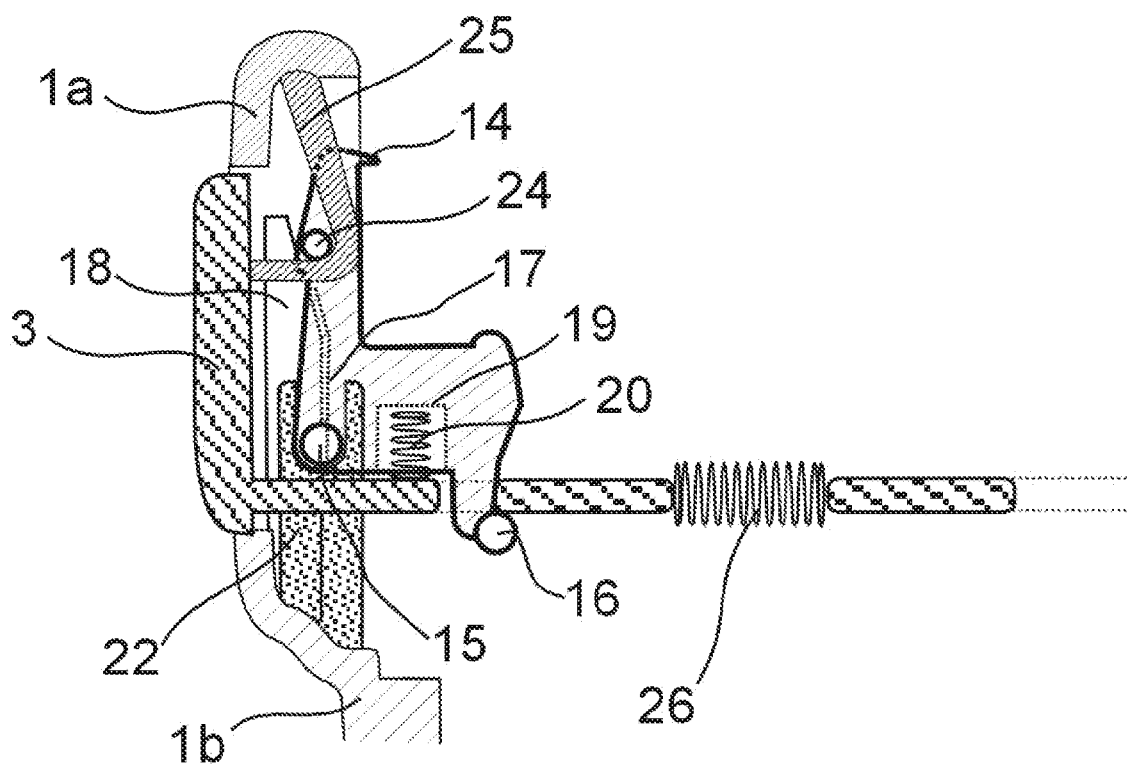
FIG. 10 is a cross-sectional view of the coupling/locking module with a side clamp in a final position with a mobile phone inserted and locked in the holder according to an embodiment of the invention.

The coupling/locking module of the mobile phone holder operates as follows: in the initial position (FIG. 6 and FIG. 9) the side clamps 10 are tilted up by the first spring 20 and drawn aside. Such a position results from the force exerted by the pins 24 on the cam 25 and a concurrent position of the pins 15 in the groove 21. The lower base parts 8 or 9 (FIG. 3 and FIG. 4) of the mobile phone, while being inserted into the holder, presses against the horizontal arm of the side clamp 10, thus overcoming the force exerted by the first spring 20 and making the clamp 10 move downwards, as a result of the motion of the pins 15 sliding in the groove 21, and also making the clamp 10 concurrently rotate towards the inside of the holder, as a results of the force exerted by the cam 25 on the pin 24. In the end phase of this rotational motion, the pins 16 of the clamp pass through the holes 23 of the unlocking buttons 3, which in turn are pushed out by the second spring 26 and thus lock the side clamps 10 on both sides in such a position that the lower part of the mobile phone is secured in the holder (FIG. 7 and FIG. 10).

To remove the mobile phone from the holder both unlocking buttons 3 are pressed towards the inside of the holder thus overcoming the pressure from the second spring 26. As a result the springs 20 lift the side clamps 10 to their initial position and thus lift the mobile phone as well so that it is ready for a smooth and convenient removal from the holder.

The holder according to the invention is suitable both for one-part mobile phones of a small thickness as well as for slider-type and flip-type phones. The mobile phones mounted in the holder according to the invention do not have to be provided with any additional holes for mounting.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

What is claimed is:

1. A mobile phone holder having a body and comprising two side clamps (10) disposed one on each side of the holder, said side clamps each having an upper arm with a tooth (14), said side clamps being coupled to one another by means of unlocking buttons (3), said unlocking buttons being provided with a hole (23), said side claims being provided with pins which engage with guides and cams disposed in the body of the holder so as to move the clamps in a translational linear motion towards the inside of the holder combined with a concurrent rotational motion towards the inside of the holder so that the clamps are locked allowing them to lock a mobile phone in the holder, wherein the side clamps (10) are provided with a pair of pins (16), which are movable through said hole (23) in the unlocking buttons (3) for locking the side clamps (10) in a position which locks the mobile phone in the holder.

2. The holder of claim 1, wherein the side clamps (10) are provided with a pair of pins (15) on both sides, which slide into guiding grooves (21) in the protrusion (22) of a lower part (1b) of the body causing the side clamps (10) to move towards the inside of the holder, and the side clamps (10) are provided with at least one pin (24), which engages with a cam (25) on an upper part (1a) of the body and causes the side clamps (10) to move rotationally towards the inside of the holder.

3. The holder of claim 2, wherein the side clamps (10) are provided with a hole (19), in which a spring (20) is mounted, said spring lifting the side clamps (10) and the mobile phone while releasing the lock.

4. The holder of claim 1, wherein the unlocking buttons (3), which are located slideably between an upper part (1a) and a lower part (1b) of the body, are connected with each other by means of a spring (26) and a wheel (27) mounted in the lower part (1b) of the body and coupling both said buttons (3).

5. The holder of claim 1, wherein the side clamps (10) are provided with a hole (19), in which a spring (20) is mounted, said spring lifting the side clamps (10) and the mobile phone while releasing the lock.

\* \* \* \* \*